United States Patent
Aggarwal et al.

(10) Patent No.: US 6,542,889 B1
(45) Date of Patent: Apr. 1, 2003

(54) METHODS AND APPARATUS FOR SIMILARITY TEXT SEARCH BASED ON CONCEPTUAL INDEXING

(75) Inventors: Charu C. Aggarwal, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,811

(22) Filed: Jan. 28, 2000

(51) Int. Cl.$^7$ .............................................. G06F 17/30
(52) U.S. Cl. ...................... 707/5; 707/1; 707/2; 707/3; 707/4; 707/10
(58) Field of Search ........................ 707/1–5, 10; 704/9

(56) References Cited

U.S. PATENT DOCUMENTS

| | | | | |
|---|---|---|---|---|
| 5,794,050 A | * | 8/1998 | Dahlgren et al. ............... | 707/5 |
| 5,913,208 A | | 6/1999 | Brown et al. | |
| 5,920,859 A | * | 7/1999 | Li ................................. | 707/5 |
| 5,963,940 A | * | 10/1999 | Liddy et al. .................... | 707/5 |
| 5,987,447 A | * | 11/1999 | Chang et al. .................... | 707/3 |
| 6,182,063 B1 | * | 1/2001 | Woods ........................... | 707/3 |
| 6,289,353 B1 | * | 9/2001 | Hazlehurst et al. ......... | 707/102 |
| 6,327,593 B1 | * | 12/2001 | Goiffon ....................... | 707/102 |

OTHER PUBLICATIONS

J. Kleinberg et al., "Applications of Linear Algebra in Information Retrieval and Hypertext Analysis," Proceedings of the ACM SIGMOD Conference, pp. 185–193, 1999.

A. Guttman, "R–Trees: A Dynamic Index Structure for Spatial Searching," Proceedings of the ACM SIGMOD Conference, pp. 47–57, 1984.

G. Salton et al., "Introduction to Modern Information Retrieval," McGraw Hill, New York, pp. 16–20, pp. 59–71 and pp. 120–123, 1983.

* cited by examiner

*Primary Examiner*—Kim Vu
*Assistant Examiner*—Cam-Y Troung
(74) *Attorney, Agent, or Firm*—Gail H. Zarick; Ryan, Mason & Lewis, LLP

(57) ABSTRACT

In one aspect of the invention, a method of performing a conceptual similarity search comprises the steps of: generating one or more conceptual word-chains from one or more documents to be used in the conceptual similarity search; building a conceptual index of documents with the one or more word-chains; and evaluating a similarity query using the conceptual index. The evaluating step preferably returns one or more of the closest documents resulting from the search; one or more matching word-chains in the one or more documents; and one or more matching topical words of the one or more documents.

39 Claims, 8 Drawing Sheets

METHODS AND APPARATUS FOR SIMILARITY TEXT SEARCH BASED ON CONCEPTUAL INDEXING

FIELD OF THE INVENTION

The present invention is related to methods and apparatus for performing similarity searches in documents and, more particularly, to performing such searches based on conceptual indexing.

BACKGROUND OF THE INVENTION

In recent years, the large amounts of data available on the world wide web has made-effective similarity search and retrieval an important issue. A similarity search has uses in many web applications such as search engines or in providing close matches for user queries. A related area is that of document-to-document queries, in which the target is an entire document, as opposed to a small number of words. Such a system has considerable use in recommender systems for a library or web application, in which it is desirable to find the closest matches to a document which is currently being browsed.

The similarity search has proven to pose an interesting problem in the text domain because of the unusually large size of dimensionality associated with the documents as compared to the size of the documents. For example, a typical document on the world wide web contains an average of about 60 to 80 words, out of a lexicon of about 100,000 words. Considerable correlations between words exist because of synonymity and different descriptions of the same underlying latent concepts. Thus, two documents containing very different vocabulary could be similar in subject material. While applying the typical similarity search method to search engines (which are a special case, in which the target document contains very few words), this problem is also observed. For example, while querying on cats, one may miss documents containing,a description on the feline species, which does not explicitly contain the word "cat." Methods exist for query expansion by including synonyms, though these methods are strictly applicable to the short and specific queries of search engines, and are too inefficient and inaccurate to generalize to document-to-document similarity queries, in which the target is itself a document containing a multitude of concepts and subjects.

Another well known problem is that of polysemy, in which the same word could refer to multiple concepts in the description. For example, the word "virus" could refer to a computer virus, or to a biological virus. Clearly, the ambiguity of the term can be resolved only by using it in the context of other terms in the document.

A well known method in the prior art for improving the quality of similarity search in text is called Latent Semantic Indexing (LSI), in which the data is transformed into a new space in which each dimension corresponds to a concept in the underlying data. This concept space depends upon the document collection in question, since different collections would have different sets of concepts. LSI is a technique which tries to capture this hidden structure using techniques from linear algebra. The idea in LSI is to project the data into a small subspace of the original data such that the noise effects, redundancies, and ambiguities are largely removed. The LSI approach is discussed in Kleinberg J., Tomkins A., "Applications of linear algebra in information retrieval and hypertext analysis," Proceedings of the ACM SIGMOD Conference, 1999, the disclosure of which is incorporated by reference herein.

Note that LSI transforms the data from a sparse indexable representation, using an inverted index, to a representation in the real space which is no longer sparse. As is well known, the inverted index is an index in which a sparse database is indexed using its attributes. Even though the new representation is of much lower dimensionality (typically about 200 or so dimensions are needed to represent the concept space), this dimensionality is beyond the capacity of indexing structures such as R-Trees to handle. R-Trees are discussed in Guttman, A., "R-Trees: A Dynamic Index Structure for Spatial Searching," Proceedings of the ACM SIGMOD Conference, 47–57, 1984. Thus, we have a difficult situation: if the data is represented in the original format using the inverted index, it is basically useless for performing a high quality document-to-document similarity search; on the other hand, when the data is transformed using latent semantic indexing, we have a data set which cannot be indexed effectively. Thus, if we have a very large collection of documents, we would either be reduced to using a sequential scan in order to perform conceptual similarity search, or have to do with lower quality search results using the original representation and ignoring the problems of synonymy and polysemy.

Another limitation of the prior art in performing document-to-document queries effectively is that a large fraction of the words in the document are unrelated to the general subject of the page. These words increase the noise effects associated with the target document, and reduce the likelihood of high quality search results. This is a problem that even latent semantic indexing cannot resolve very effectively.

Accordingly, a need exists for methods and apparatus for providing a high quality similarity search and a relatively low cost indexing methodology for use, for example, in accordance with document-to-document search applications.

SUMMARY OF THE INVENTION

The present invention provides methods and apparatus for performing similarity search in documents. A framework for providing conceptual similarity between documents is provided using clustering. The methodology of the invention also provides effective indexing techniques so that a similarity search can be performed on large collections of documents by accessing only a small percentage of the data. We demonstrate that our methodology performs substantially better than the standard method of using similarity search on the inverted index both in terms of quality and search efficiency.

In one aspect of the invention, a method of performing a conceptual similarity search comprises the steps of: generating one or more conceptual word-chains from one or more documents to be used in the conceptual similarity search; building a conceptual index of documents with the one or more word-chains; and evaluating a similarity query using the conceptual index. As will be explained in detail below, the present invention provides for the creation of a concept space comprising a new axis system which is defined by a set of these word-chains. Each word-chain comprises a set of closely related words (or topical vocabulary) associated with a given cluster, and the conceptual strength of document with respect to a word-chain defines how closely that document matches this vocabulary.

The word-chain generating step may comprise the steps of: initializing one or more word-chains to one or more sets of randomly selected documents; assigning one or more other documents to the one or more sets of randomly selected documents; concatenating the one or more documents in each set and removing less frequently occurring words from each word-chain; and merging the word-chains. The initializing, assigning, concatenating and merging steps are then iteratively repeated to generate a final set of word-chains.

The index building step may comprise the steps of: for each word-chain, finding the one or more documents with conceptual similarity to the word-chain; and retaining a list of identities of the one or more documents which have conceptual similarity not less than a predefined threshold value. The document identity preferably comprises a unique integer value.

The evaluating step preferably returns one or more of the closest documents resulting from the search; one or more matching word-chains in the one or more documents; and one or more matching topical words of the one or more documents. Particularly, the evaluating step may comprise the step of generating a conceptual representation of a target document associated with the similarity query. In one embodiment, the target document conceptual representation generating step comprises the steps of: calculating a similarity measure between the target document and each conceptual word-chain; determining whether each similarity measure is not less than a predetermined threshold value; and generating conceptual strength measures by respectively setting a conceptual strength measure to a similarity measure minus the predetermined threshold value, when the similarity measure is not less than a predetermined threshold value. The evaluating step may then comprise the step of finding a substantially close match to a target document among a plurality of indexed documents using the conceptual representation of the target document. In one embodiment, the finding step may comprise the steps of: finding one or more concepts in the target document; evaluating an inverted list associated with the indexed documents to find the one or more documents which have at least one concept in common with the target document; calculating a conceptual cosine of the one or more common concept documents to the target document; finding the closest document to the target document based on the conceptual cosine; and reporting an output statistic between the closest matching document and the target document. The closest document finding step may further comprise the steps of: reporting concepts which are present in the target document and the closest matching document; and finding a topical vocabulary which is common to the target document and the closest matching document and matching word-chains.

It is to be appreciated that, in accordance with the present invention, we use the inverted index in the context of an information retrieval application in which the sparsity of the data set arises out of the small.percentage of words from the entire lexicon which are present in a given document. In the inverted representation, for each word (or attribute for the text application), we have a list of document identifications (IDs) which correspond to all the documents which contain that word. Thus, there are as many lists as the number of words in the lexicon, and the length of a list corresponds to the number of documents which contain that word.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
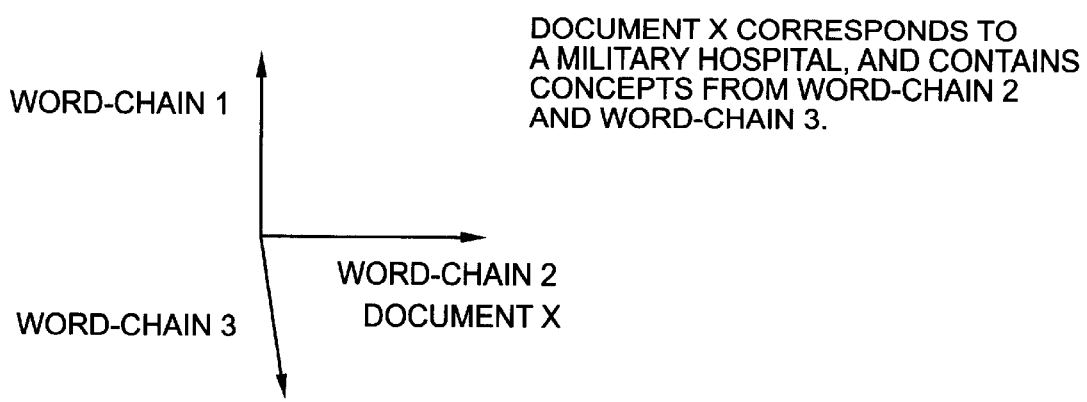
FIG. 1 is a diagram illustrating a three-dimensional subspace according to a simple example of a conceptual representation indexing methodology according to an embodiment of the present invention.

The detailed description will be divided into the following sections for ease of reference: (I) Definitions and Notations; (II) Concept Space; and (III) Illustrative Embodiments.

I. Definitions and Notations

In this section, we discuss methods for document representation, normalization, and similarity measures. A well known method for document representation is called the vector space format. In this case, each document is represented by a vector of terms. Each term corresponds to a word in the dictionary of possibilities. Thus, the length of the vector for a given document is equal to the total number of words or terms in the dictionary of possibilities from which the terms are drawn. The value of each element in this vector is equal to the weight of the corresponding word. This weight represents the "relative importance" of the word in that document. Typically, the weight of the word in a document depends upon the frequency of the word in that document and a number which we refer to as the normalization factor for the word. We will discuss below how the normalization of the weights of the different words may be done.

In order to understand the vector space format better, let us consider the case when the documents are drawn from the set of 6 terms: A, B, C, D, E, and F. In typical applications, the total lexicon of terms could be of the order of several thousand words. For the purpose of this example:

Let us consider the two documents X, and Y. Let us say that the documents X and Y contain the following terms:

Document X: A with frequency 2, C with frequency 4, D with frequency 5, F with frequency 3.

Document Y: B with frequency 3, D with frequency 7, and E with frequency 5.

If the weight of a term is equal to its frequency in the documents, then the vector space representation for documents X and Y are as follows:

Vector=(A, B, C, D, E, F)

Document X=(2, 0, 4, 5, 0, 3)

Document Y=(0, 3, 0, 7, 5, 0)

The above example illustrates a vector length of only six. In real applications, the number of terms from which the documents are drawn could be of the order of several tens of thousands. Correspondingly, the vector for each document would also be of this similar size of several thousand words. Since each document contains a relatively small number of words, the technique represents the data rather sparsely. Thus, most of the term weights are equal to zero. Correspondingly, the data structure representations of the documents can also be represented in sparse format, where lists are maintained for each document. The list for a document contains the set of words in it along with the corresponding weights.

Often, it is desirable to perform normalization on the different terms of the document. Often words which are relatively common such as "good," "high" or "place," are less indicative of the subject material of a document, as compared to more specific words such as "architects," "estate" or "rental." One way to handle this is to give greater weight to terms which are less common. The inverse document frequency (or IDF) of a word is defined by the inverse of the number of documents in the training data in which that word occurs. Thus, words which occur in a fewer number of documents have a higher IDF, while words which occur in more documents have a lower value of the IDF. The frequency of each word in the vector space representation may be multiplied by the inverse document frequency in order to give each word its appropriate importance. Such normalization functions have disadvantages as well. In relatively non-standard and non-structured collections of the documents such as those drawn from web pages, such normalizations often worsen the quality of performance of the system, since undue weightage is given to misspellings and other non-standard words. For the purpose of the present invention, we discuss the concept of normalization only from an academic perspective; since normalization techniques are well known in the prior art, e.g., Salton G., McGill M. J., "Introduction to Modem Information Retrieval," McGraw Hill, New York, the disclosure of which is incorporated by reference herein. We do not restrict the use of the present invention to any particular kind of normalization function. Thus, each document is defined by a collection of terms (or words) and the weight of each term is defined to be the importance of that term. This weight may correspond to the relative frequency of the term in the document, or some function of it. For the purpose of this invention, the use of the term "frequency" refers to the use of normalized values of the frequency of the words in the documents, as opposed to the actual values. We shall interchangeably use the term "weight" in order to represent the normalized frequency of the different words in the document.

Various similarity measures are known, e.g., the above-referenced Salton et al. article, in order to evaluate the closeness of the different documents. An example of such a similarity measure is the cosine function. The cosine of two vectors is defined as the dot product of the two vectors divided by the product of the absolute magnitudes of the two vectors. The cosine of the angle between V1 and V2 is given by:

$$\text{cosine}(V1, V2) = V1.V2/(|V1|.|V2|)$$

For the example of the documents X and Y above:

V1=(2 0 4 5 0 3)

V2=(0 3 0 7 5 0)

$V1.V2 = 2.0 + 0.3 + 4.0 + 5.7 + 0.5 + 3.0$ $|V1| = 2^2 + 4$ $2 + 5^2 + 3^2 = \sqrt{54}$ $|V2| = 3$ $2 + 7^2 + 5^2 = \sqrt{83}$ Upon calculation of the expression, we obtain the cosine as 0.523. It is to be noted that the value of the cosine between two documents increases when the number of words in common are greater. Thus, higher values of the cosine function imply greater similarity. A number of other functions are known which may be used in order to evaluate the similarity between two text documents. Again, the use of the present invention is not restricted to use of any particular similarity function. However, we provide an overview of this calculation in order to provide better exposition.

We now describe some notations which we use and/or are applicable for purposes of the present invention.

(a) Damping Function

A damping function is defined to be a function which is applied to the frequencies of the different words in the documents in order to reduce the skew in frequency distribution. Some examples of damping functions include the square-root function and the logarithmic function. For example, when the square root damping function is applied on the document (2 0 4 5 0 3), then we obtain the vector: (1.414, 0, 2, 2.236 0 1.732). For the case of the document Y, when we apply the same damping function, we obtain the following frequencies: (0, 1.732, 0, 2.646, 2.236 0).

(b) Meta-documents

Meta-documents are documents which are not present in the training data, and are defined to be a function of more than one document. In general, a meta-document is defined to be a concatenation function of the different documents. For example, one possible way of constructing a meta-document would be to apply the damping function to each of the documents and then add up the damped frequencies of the different documents. For example, if documents X and Y are the only two documents from which we wish to create the meta-document, then upon applying the square-root damping function to both X and Y, and adding up the frequencies, we obtain: (1.414 1.732 2 4.892 2.236 1.732). The above illustrates only one example of a creation of a meta-document. Other functions or possibilities may also be suitable.

(c) Centroid

A centroid is defined for a set of documents in a cluster. The centroid is a meta-document obtained by concatenating (or appending) the different documents in this set. In the vector-space format, this corresponds to adding the frequencies for the different terms in the documents. Thus, the centroid of a cluster of documents is obtained by concatenating the set of documents in that cluster. Suppose that a cluster contains the two documents of the example X and Y. Then, the vector space representation of the centroid is given by (2, 3, 4, 12, 5, 3).

(d) Pseudo-centroid

A pseudo-centroid is a meta-document which is obtained from a set of documents by concatenating the documents after applying a damping function to each of the documents in that set. An example of the calculation of a pseudo-centroid is discussed in the above definition of meta-documents, if we assume that X and Y are the only two documents in a cluster.

(e) Projection

The process of performing projection is relevant to meta-documents only for the purpose of the present invention. Projection is defined to be the process of reducing the number of terms in a meta-document, by throwing away those terms which have less weight. There are various ways of performing projections: one way is to throw away those terms whose weight is below a certain percentage of the total weight of the terms in the document. Another way is to retain a predefined number of terms in the meta-document. For example, if it is desired to keep the three most important terms in the meta-document defined by (1.414 1.732 2 4.892 2.236 1.732), then after performing the projection, the resulting meta-document will consist of the following vector: (0 0 2 4.892 2.236 0).

(f) Word-chain

A word-chain is defined in the same way as a pseudo-centroid, except that the words with the least weight are projected out. The resulting meta-document is referred to as a word-chain.

II. Concept Space

In accordance with the present invention, the concept space comprises a new axis system which is defined by a set of word-chains. These word-chains are derived from a clustering technique, which creates clusters of documents which are naturally anchored around these word-chains. The clustering method will be discussed in more detail below. Thus, dimensionality of this space is defined by the number of clusters, and each axis is defined by the vector space representation of the word-chain. Let us assume that the vector space representation of the set of k word-chains are denoted by $v_1 \ldots v_k$. Thus, the axis system of the invention contains each $v_i$ as a word-chain. Note that two chains may have words in common (resulting in a non-zero angle between them), but since if the clusters are well separated, we can approximate the concept space to be an orthogonal axis representation. Let us also assume that u is the vector space representation of a given document. Then, in the conceptual coordinate system, the coordinate along the axis $v_i$ is given by max $\{0, \text{cosine}(u, v_i)-t\}$. Here, t in (0, 1) is a suitably defined constant which we shall define as the "activation threshold." We will discuss this value more below. The value of the $i^{th}$ coordinate in this axis system is the conceptual strength.

In order to intuitively understand the concept space, let us consider what the coordinates corresponding to a given document refer to. Each word-chain comprises a set of closely related words (or topical vocabulary) of a given cluster, and the conceptual strength of a document with respect to a word-chain defines how closely that document matches this vocabulary. Thus, if the subject matter of the document matches the cluster closely, then this coordinate is likely to be close to 1, whereas, if the subject matter of the document is unrelated to the cluster then this number is likely to be zero.

For example, consider FIG. 1, in which we show a small 3-dimensional subspace of the entire axis system. Each of these axes corresponds to some word-chain. Word-chain 1 may comprise such words as "arts, painting, artist, gallery, . . . ". Word-chain 2 may comprise such words as "army, regiment, troops, reserves, . . . ". Word-chain 3 may comprise such words as "hospital, patient, doctor, clinic, . . . ". The word-chains may be related to a particular subject as is illustrated in FIG. 1. The particular document X illustrated in FIG. 1 is from a military hospital, and shares concepts from two of the three word-chains, i.e., word-chains 2 and 3. The coordinates in this axes system provide a very good understanding of the concepts in.this document. This description is more noise-free than a text description, since it is constructed from a set of reasonably well-separated word-chains, rather than a huge vocabulary which creates the problems of redundancy and ambiguity.

The conceptual representation of documents in this new space can be used in order to calculate the conceptual similarity between the pair. Let $A=(a_1, \ldots a_k)$ and $B=(b_1, \ldots b_k)$ be the coordinates of two points in the concept space. Then, the conceptual cosine between the two documents is defined in a similar way as the cosine between pairs of documents except that the above-mentioned conceptual coordinates A and B are used as opposed to the vector space representations of the documents themselves.

In the conceptual representation, when the clusters are reasonably well separated, a given document is likely to share substantial vocabulary with only a few of the word-chains. In terms of the coordinate representation, this means that only a few of the components are likely to be strongly positive, while most components are close to zero.

In order to make the conceptual representation of the documents indexable in the inverted representation, we perform the following truncation operation. We set a particular component of the set of coordinates to zero, if its value is less than a certain amount called the "activation threshold." We shall denote this number by t. Note that since each coordinate lies in the range (0, 1), the value of t also lies in this range. The aim is to create a conceptual representation which summarizes the information in the document in terms of a small number of concepts which are specific to the particular collection in question. The use of an activation threshold ensures that even though a document may share a tiny amount of vocabulary from many word-chains, these correspond to the noise-effects stemming from words which are not generally related to the dominant topics in the document. Furthermore, even though the document may share only a small amount of noisy vocabulary from each such word-chain, the sum of the noise effects over all the different word-chains could be considerable. In effect, only a fraction of the vocabulary in the document may be used in order to create the non-zero components in the conceptual representation. It is presumed that such words are the topical words of that document.

One way of viewing conceptual representation is as a compressed representation of the documents which reduces the inherent noise effects of ambiguity and redundancy in the attributes of a text system because of synonymy and polysemy. Latent semantic indexing attempts to achieve this by picking a small subspace of the original data in which shows the maximum variation in the distribution of the features.

The small number of positive components in the conceptual representation makes the data indexable, since the inverted representation is dependent upon the scarcity of the data. We use a standard similarity search algorithm on the inverted index (e.g., as per the above-referenced Salton et al. article) for both the document representation and the concept representation. This method has been discussed in the prior art, and we shall use that technique for similarity search in an embodiment of the invention.

III. Illustrative Embodiments

The following description will illustrate the invention using an exemplary document search system. It should be understood, however, that the invention is not limited to use with any particular search system architecture. The invention is instead more generally applicable to any search system in which it is desirable to provide a high quality similarity search at a relatively low indexing cost.

Figure 2:
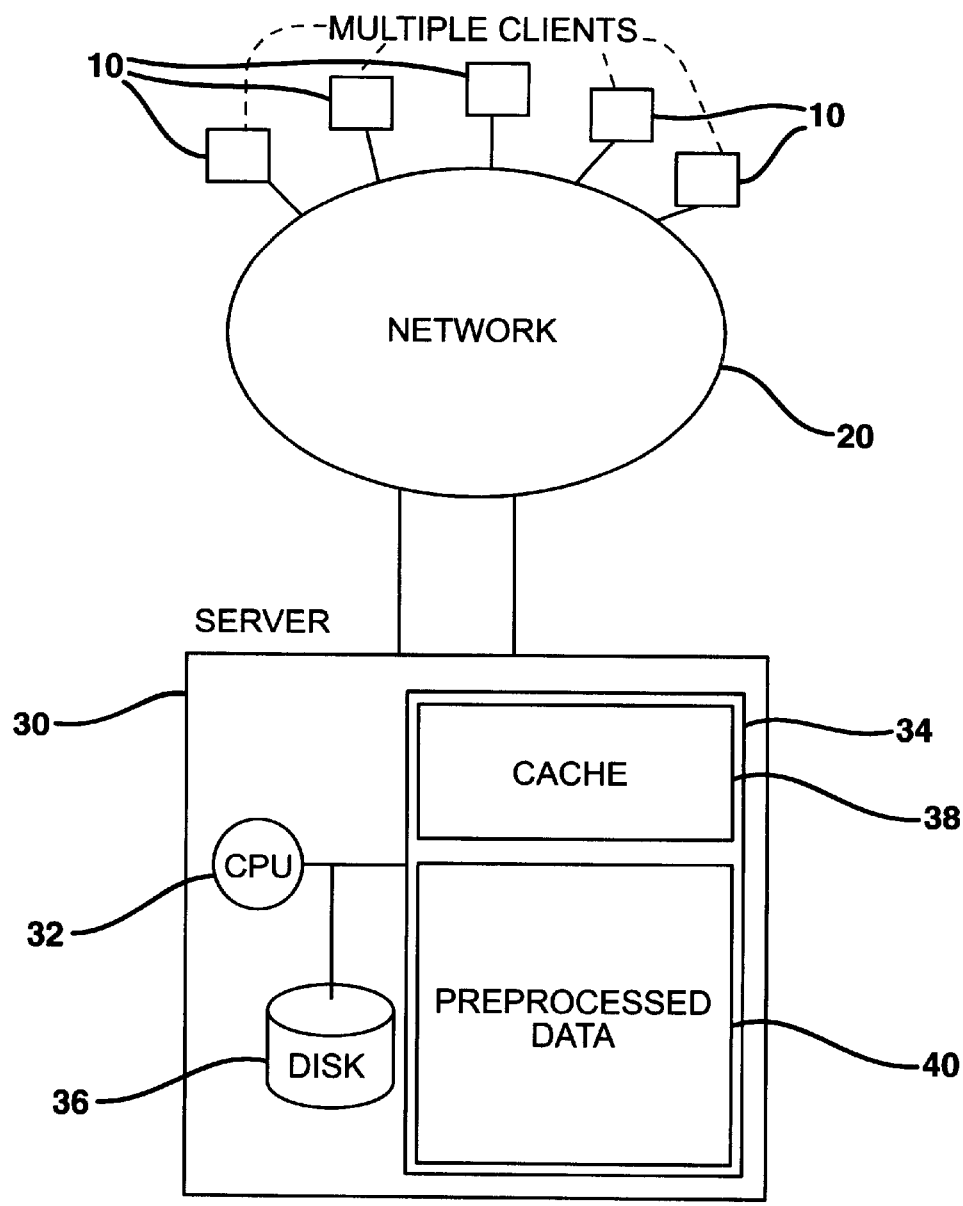
FIG. 2 is a block diagram illustrating a hardware implementation suitable for employing indexing and searching methodologies according to an embodiment of the present invention.

Referring now to FIG. 2, an exemplary architecture suitable for employing the present invention is shown. As illustrated, an exemplary system comprises client devices 10 coupled, via a large network 20, to a server 30. The server 30 may comprise a central processing unit (CPU) 32, coupled to a main memory 34 and a disk 36. The main memory 34 may comprise a cache 38 and preprocessed data 40. It is assumed that multiple clients 10 can interact with the server 30 over the large network 20. It is to be appreciated that the network 20 may be a public information network such as, for example, the Internet or world wide web, however, the clients and server may alternatively be connected via a private network, a local area network, or some other suitable network. The similarity queries originate at the client end, which are then transmitted to the server over the network. The queries are resolved at the server end and transmitted back to the client. The calculations for the similarity.queries are made at the CPU 32 at the server end. In order to make these calculations, the inverted index representation of the documents should be stored at the server. This is stored either in the main memory 34 or in the disk 36 at the server end. Specifically, the inverted index representation of the documents is stored in the preprocessed data section 40 of the main memory 34 or the disk 36 at the server. In addition, a cache 38 is preferably present at the server end in order to speed up calculations.

Accordingly, in this illustrative embodiment, the indexing methodologies of the present invention are executed in association with the server 30, while the searching methodologies are executed in association with the server in response to a search request received from a client device 10. All or a portion of the results generated in association with the server are then presented, e.g., displayed, to a user at the client device. Further, in one embodiment, software components including instructions or code for performing the methodologies of the invention, as described herein, may be stored in one or more memory devices described above and, when ready to be utilized, loaded in part or in whole and executed by the CPU.

Figure 3:
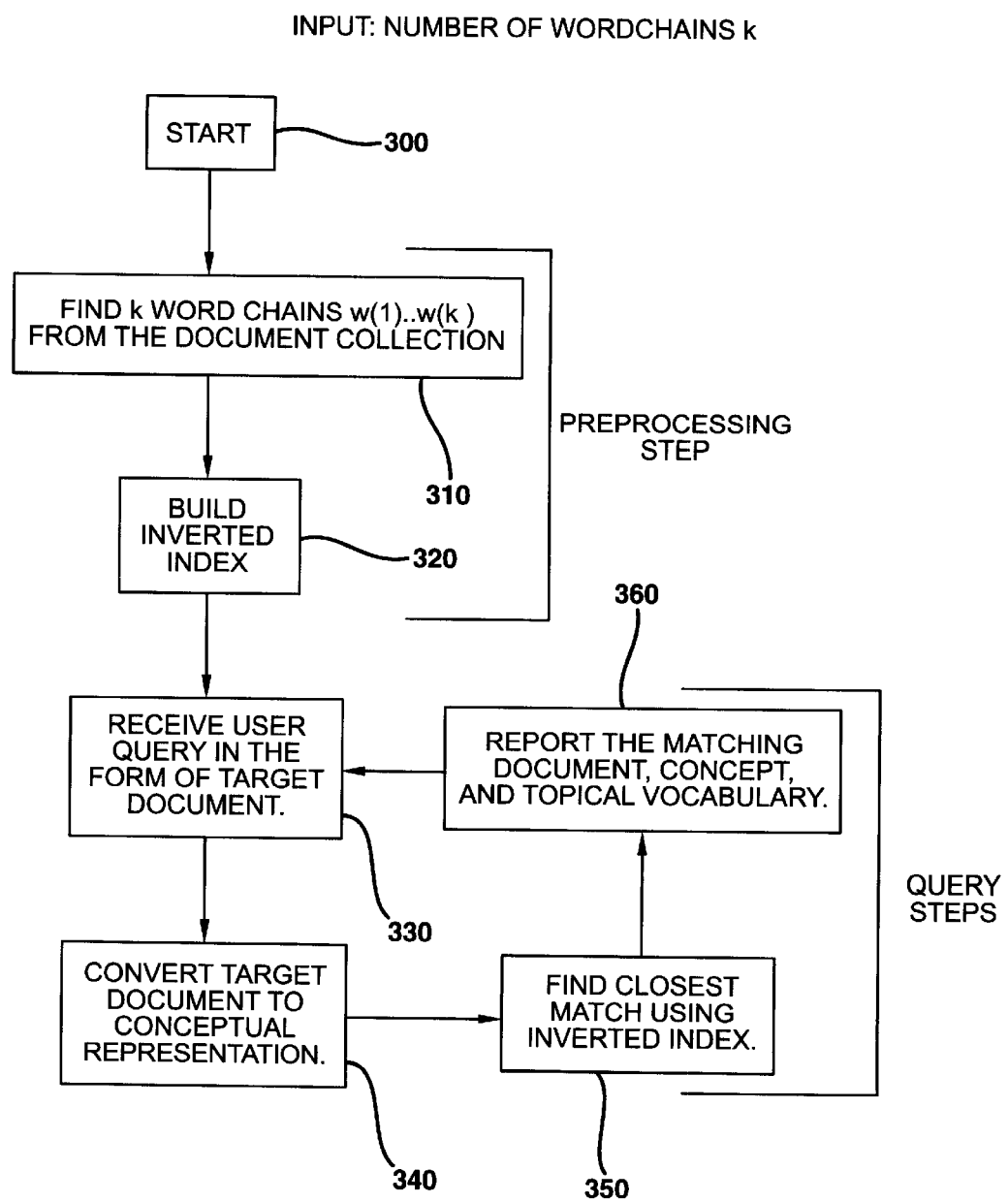
FIG. 3 is a flow diagram illustrating an overall process for creating an index at a server end and using it for repeated queries from a client end according to an embodiment of the present invention.

Referring now to FIG. 3, an overall process is shown for creating an index at a server end and using it for repeated queries from a client end according to an embodiment of the present invention. The overall process comprises a preprocessing step which is outlined in steps 310 and 320, and a query step which is outlined in steps 330 through 360. The process starts at block 300. In step 310, we use the document collection in order to create k word-chains, w(1) . . . w(k), which are used for the conceptual representation of the documents. The value of k is a user-defined parameter. In step 320, we build the inverted index of documents using these word-chains. This inverted index is stored at the server end. These steps are discussed below in more detail in the context of FIGS. 4 and 5. Once the preprocessing step is complete, the repeated queries from the client end can be resolved effectively. In step 330, the server receives the user query in the form of a target document. In step 340, this target document is converted to the conceptual representation. In step 350, we find the closest match using the inverted index. This closest match is reported, in step 360, along with the matching vocabulary and concepts.

Figure 4:
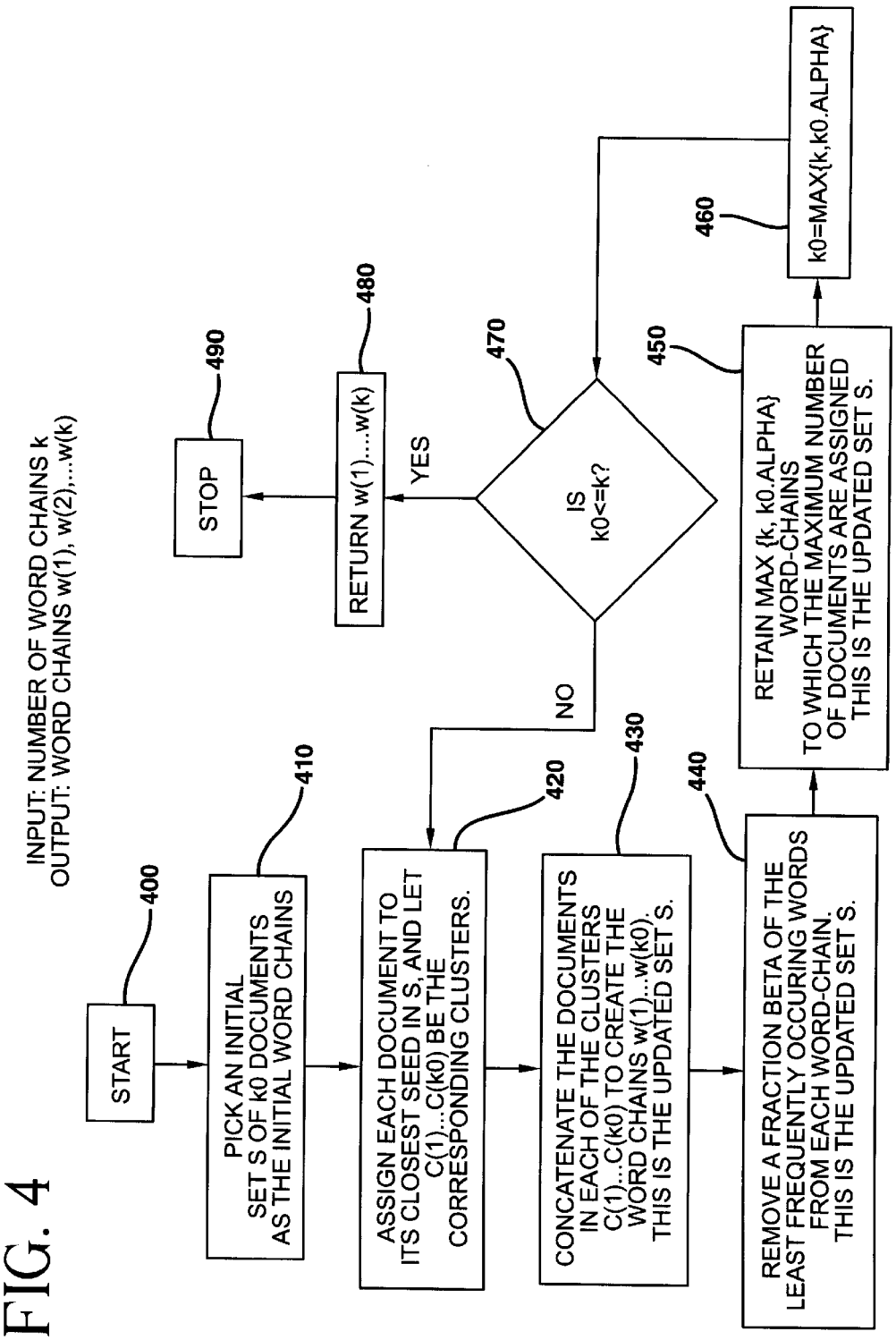
FIG. 4 is a flow diagram illustrating a process for creating word-chains from a document collection according to an embodiment of the present invention.

In FIG. 4, a process for creating word-chains from the documents in the collection according to an embodiment of the.present invention is shown. It is to be understood that this process corresponds to step 310 in FIG. 3. As discussed earlier, each of these word-chains is like a meta-document from the collection. We build the word-chains in a process by iteratively creating clusters of documents which are naturally anchored around these word-chains. We shall also refer to these word-chains as "seeds" for the purpose of this invention. The process begins at block 400. In step 410, we start by picking an initial set of k0 documents as the initial word-chains. The value of k0 is a user-defined parameter and affects the quality of the results obtained by the method. Larger values of k0 are desirable, since they improve the quality, but also increase the running times. The initial set of k0 seeds is denoted by S. In step 420, we assign each document to its closest seed in S. The closest seed to a document is found by calculating the cosine similarity function to each seed, and picking the seed with the highest similarity value. This results in the clusters C(1) . . . C(k0). In step 430, we concatenate the documents in each of the clusters C(1) . . . C(k0) to create the words-chains w(1) . . . w(k0). This is the updated set S. The process of concatenation of documents has been defined above. In step 440, we remove a fraction beta of the least frequently occurring words from each word-chain. This is the process of projection, as was discussed above. The value of the fraction beta is a user-defined parameter. Another user-defined parameter is alpha, which denotes the fraction of the word-chains which are retained in each iteration. Alpha may also be thought of as denoting the percentage of seeds which are retained in each iteration. In step 450, we retain max {k, k0.alpha} of the word-chains to which the maximum number of documents are assigned in step 420. The remaining chains are removed from S. In step 460, we multiply k0 by alpha. We check is k0 is, at most, equal to k, in step 470. If not, we return to step 420. Otherwise, we return the word-chains w(1), w(2) . . . w(k) in step 480. The process ends at block 490.

Figure 5:
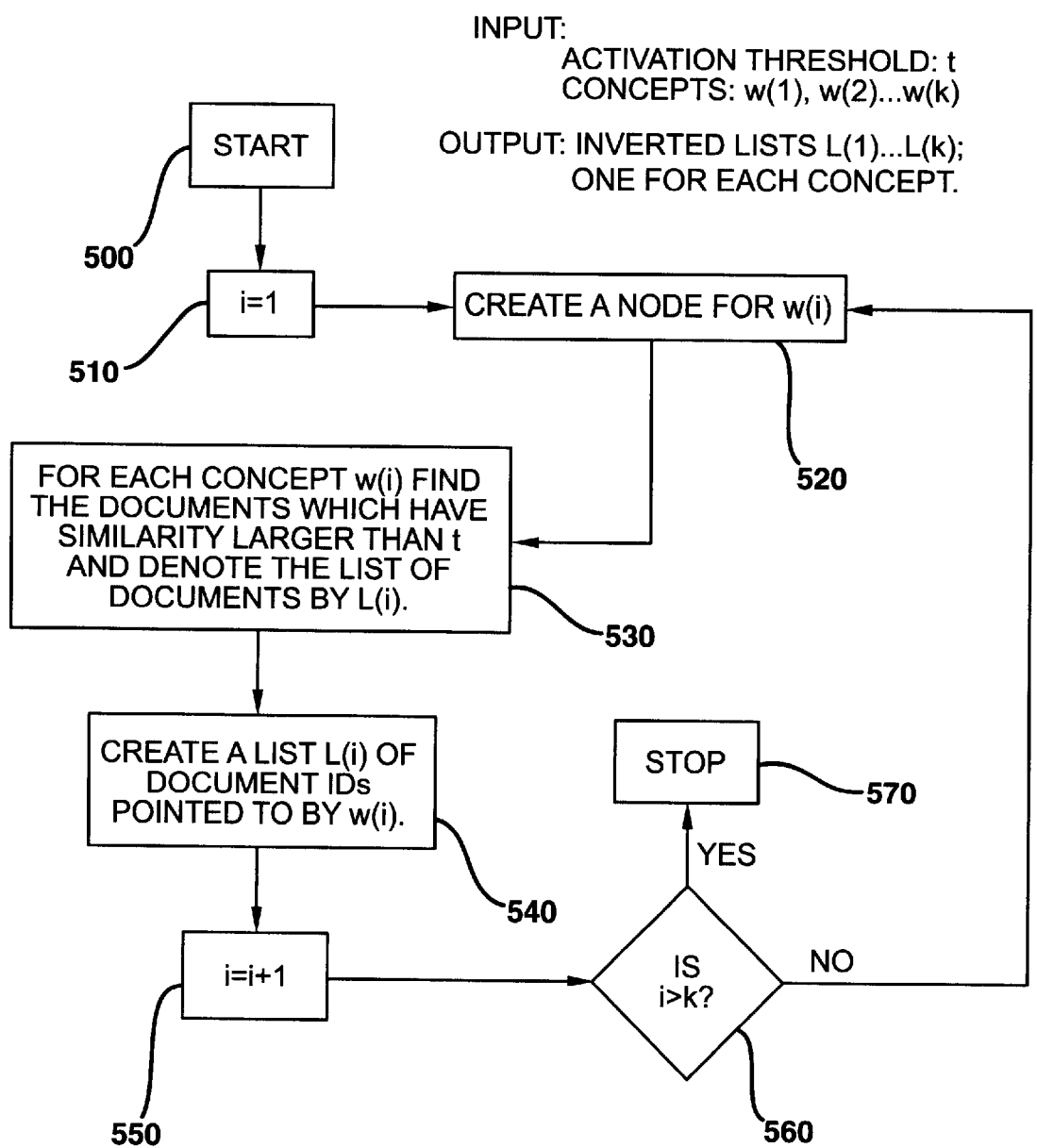
FIG. 5 is a flow diagram illustrating a process of building an inverted index from a collection of documents and concepts which are created in accordance with FIG. 4.

In FIG. 5, we illustrate one embodiment of how to use the word-chains which are created in the process described in the context of FIG. 4 in order to create the final inverted representations of the documents which are used for conceptual similarity search. It is to be understood that this process corresponds to step 320 in FIG. 3. Also, input to the process is the activation threshold t. The process begins at block 500. In step 510, we set a counter i to 1. This counter i may vary between 1 and k. In step 520, we create a node for w(i). This node points to an inverted list of document IDs (identifications) for which the node w(i) is most relevant. In step 530, we find the documents which have similarity to the target larger than the activation threshold t. Again, the similarity may be calculated using the cosine function which has been discussed above. We denote the list of documents pointed to by concept i by L(i). This list L(i) is pointed to by the node represented by w(i) in the inverted representation. In other words, L(i) comprises the set of document IDs pointed to by w(i). The actual documents may be present somewhere on the disk 36 (FIG. 2). A document ID is an integer which identifies the document uniquely. The counter i is incremented by 1 in step 550. In step 560, we check whether i is larger than k. If not, then we return to step 520. Otherwise, we stop at block 570. The output of the process is thus the inverted lists L(1) . . . L(k), one for each concept.

Figure 6:
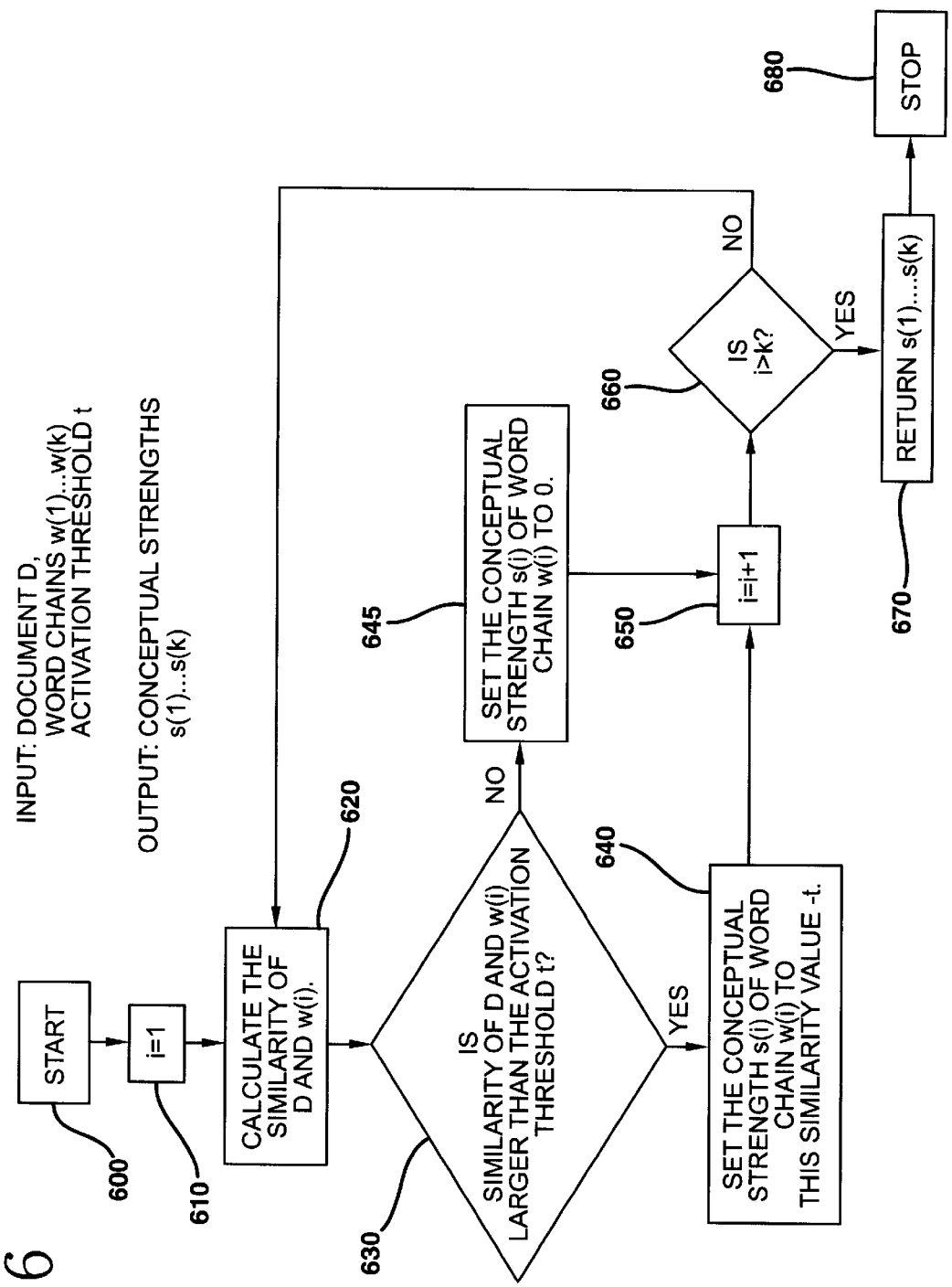
FIG. 6 is a flow diagram illustrating creation of a conceptual representation of a target document according to an embodiment of the present invention.

In FIG. 6, we show one embodiment of how to find the conceptual representation of a target document D. It is to be understood that this process corresponds to step 340 in FIG. 3. Another input to the process is the conceptual word-chains w(1) . . . w(k). The process starts at block 600. In step 610, we set a counter i to 1. The value of this counter varies from 1 through k. In step 620, we calculate the similarity of the document D and the concept w(i). In step 630, we check if this similarity is larger than the activation threshold t. If so, in step 640, we set the conceptual strength s(i) of word-chain w(i) to this similarity value minus t, otherwise, we set it to 0, in step 645. In step 650, we increment i by 1. We check if i is larger than k, in step 660. If not, then we return to step 620. Otherwise, we return the conceptual strengths s(1) ... s(k), in step 670. The process ends at block 680.

Figure 7:
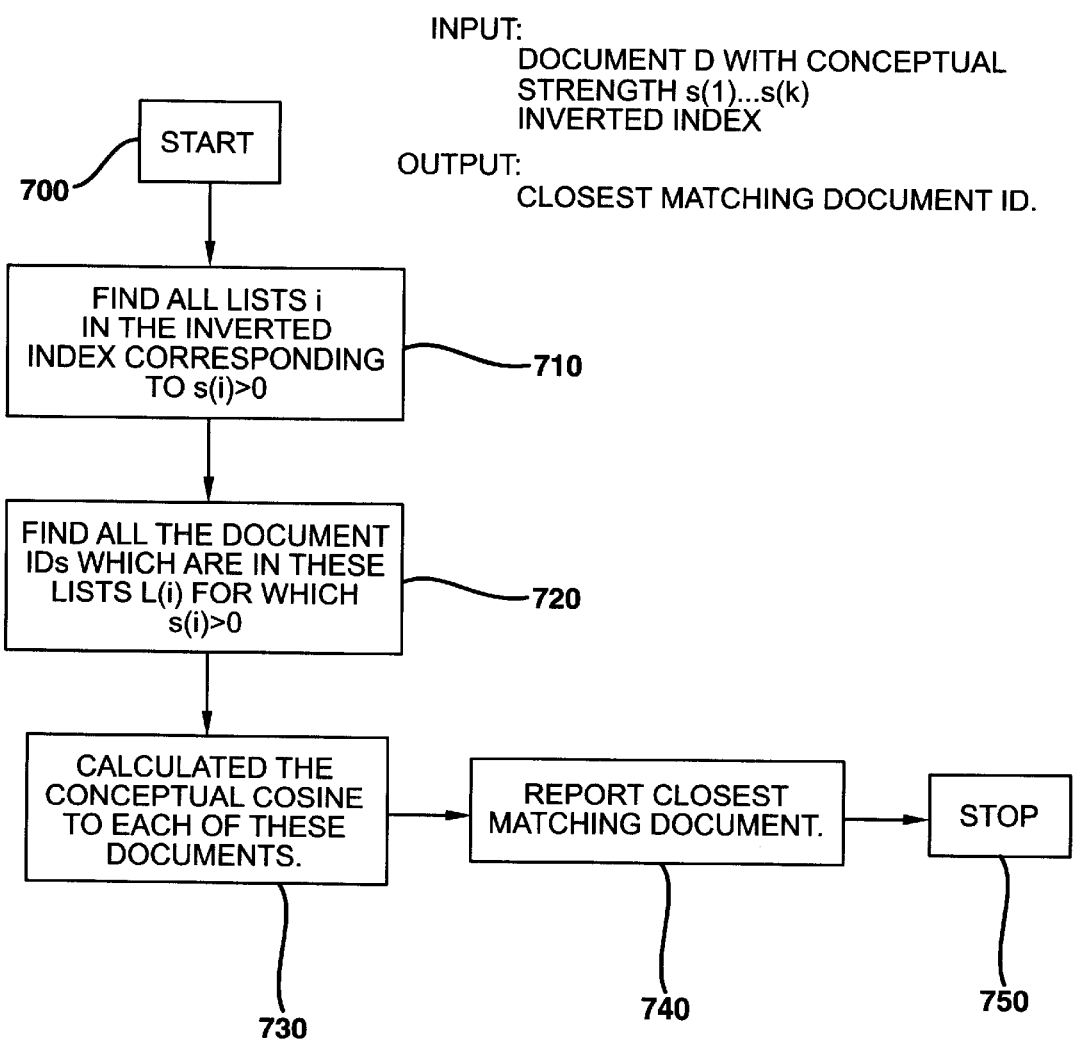
FIG. 7 is a flow diagram illustrating how a closest match to a target document is found according to an embodiment of the present invention.

Referring to FIG. 7, we show one embodiment of how to find the closest matching document ID to a given target document. It is to be understood that this process corresponds to step 350 in FIG. 3. The conceptual representation which is the output of the process depicted in FIG. 6 is helpful in finding this closest match. The process begins at block 700. In step 710, we find all the inverted lists L(i) corresponding to s(i)>0. Note that each of these lists L(i) is a list of document IDs. In step 720, we take the union of these document IDs. The conceptual cosine to each of the documents on this list is calculated in step 730. In step 740, we report the closest matching document ID. The process ends at block 750.

Figure 8:
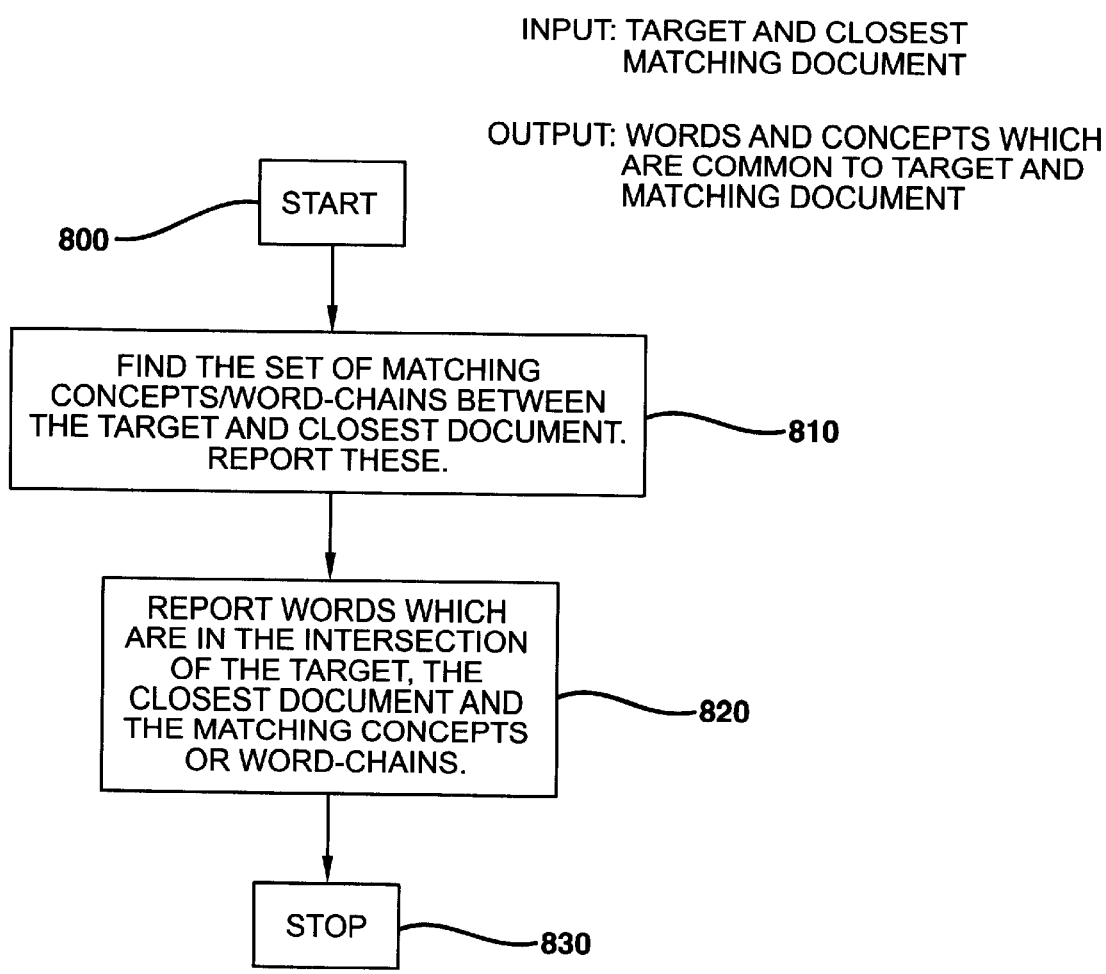
FIG. 8 is a flow diagram illustrating a process of reporting common concepts between target and closest matching document according to an embodiment of the present invention.

In FIG. 8, we show one embodiment of how to find the concepts and the topical vocabulary which are common to the target and most closely matching document. It is to be understood that this process corresponds to step 360 in FIG. 3. This is useful in finding the overall subject on which the match is found. The process begins at block 800. In step 810, we find those sets of word-chains for which the conceptual strength is larger than zero in both the target and the matching document. These are the matching-concepts between the target document and the closest neighbor. These word-chains are the set of matching concepts between the two documents and are reported. In step 820, we find the words which are common to: (a) the target document; (b) the closest matching document; and (c) the union of the word-chains calculated in step 810. These are the matching topical words for the two documents and are reported in step 820. The process ends at block 830.

Accordingly, in this invention, we provide a system and method for conceptual indexing and a similarity search in text. This method may be applicable to building a wide variety of recommender systems. The method is capable of returning the closest document matching a given target, as well as the topical words which are common to the matching document and the target document.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of performing a conceptual similarity search, the method comprising the steps of:

generating one or more conceptual word-chains from one or more documents to be used in the conceptual similarity search, wherein at least one of the one or more word-chains comprises a meta-document formed by applying a damping function to a set of the one or more documents, concatenating the document set after application of the damping function, and removing from the meta-document one or more least-weighted words;

building a conceptual index of documents with the one or more word-chains; and evaluating a similarity query using the conceptual index.

2. The method of claim 1, wherein the index building step comprises the steps of:

for each word-chain, finding the one or more documents with conceptual similarity to the word-chain; and retaining a list of identities of the one or more documents which have conceptual similarity not less than a predefined threshold value.

3. The method of claim 2, wherein a document identity comprises a unique integer value.

4. The method of claim 1, wherein the evaluating step comprises returning one or more of the closest documents resulting from the search.

5. The method of claim 1, wherein the evaluating step comprises returning one or more matching word-chains in the one or more documents.

6. The method of claim 1, wherein the evaluating step comprises returning one or more matching topical words of the one or more documents.

7. The method of claim 1, wherein the evaluating step comprises the step of generating a conceptual representation of a target document associated with the similarity query.

8. The method of claim 7, wherein the evaluating step comprises the step of finding a substantially close match to a target document among a plurality of indexed documents using the conceptual representation of the target document.

9. A method of performing a conceptual similarity search, the method comprising the steps of:

generating one or more conceptual word-chains from one or more documents to be used in the conceptual similarity search;

building a conceptual index of documents with the one or more word-chains; and evaluating a similarity query using the conceptual index;

wherein the word-chain generating step comprises the steps of:

initializing one or more word-chains to one or more sets of randomly selected documents;

assigning one or more other documents to the one or more sets of randomly selected documents;

concatenating the one or more documents in each set and removing less frequently occurring words from each word-chain; and merging the word-chains.

10. The method of claim 9, wherein the initializing, assigning, concatenating and merging steps are iteratively repeated.

11. A method of performing a conceptual similarity search, the method comprising the steps of:

generating one or more conceptual word-chains from one or more documents to be used in the conceptual similarity search;

building a conceptual index of documents with the one or more word-chains; and evaluating a similarity query using the conceptual index;

wherein the evaluating step comprises the step of generating a conceptual representation of a target document associated with the similarity query, and wherein the target document conceptual representation generating step comprises the steps of:

calculating a similarity measure between the target document and each conceptual word-chain;

determining whether each similarity measure is not less than a predetermined threshold value; and generating conceptual strength measures by respectively setting a conceptual strength measure to a similarity measure minus the predetermined threshold value, when the similarity measure is not less than a predetermined threshold value.

12. A method of performing a conceptual similarity search, the method comprising the steps of:

generating one or more conceptual word-chains from one or more documents to be used in the conceptual similarity search;

building a conceptual index of documents with the one or more word-chains; and evaluating a similarity query using the conceptual index;

wherein the evaluating step comprises the step of generating a conceptual representation of a target document associated with the similarity query and finding a substantially close match to a target document among a plurality of indexed documents using the conceptual representation of the target document, and wherein the finding step comprises the steps of:

finding one or more concepts in the target document;

evaluating an inverted list associated with the indexed documents to find the one or more documents which have at least one concept in common with the target document;

calculating a conceptual cosine of the one or more common concept documents to the target document;

finding the closest document to the target document based on the conceptual cosine; and reporting an output statistic between the closest matching document and the target document.

13. The method of claim 12, wherein the closest document finding step further comprises the steps of:

reporting concepts which are present in the target document and the closest matching document; and finding a topical vocabulary which is common to the target document and the closest matching document and matching word-chains.

14. Apparatus for performing a conceptual similarity search, the apparatus comprising:

at least one processor operative to: (i) generate one or more conceptual word-chains from one or more documents to be used in the conceptual similarity search, wherein at least one of the one or more word-chains comprises a meta-document formed by applying a damping function to a set of the one or more documents, concatenating the document set after application of the damping function, and removing from the meta-document one or more least-weighted words; (ii) build a conceptual index of documents with the one or more word-chains; and (iii) evaluate a similarity query using the conceptual index; and memory, coupled to the at least one processor, for storing at least one of the conceptual word-chains and the conceptual index.

15. The apparatus of claim 14, wherein the processor is further operative to perform the index building operation by: (i) for each word-chain, finding the one or more documents with conceptual similarity to the word-chain; and (ii) retaining a list of identities of the one or more documents which have conceptual similarity not less than a predefined threshold value.

16. The apparatus of claim 15, wherein a document identity comprises a unique integer value.

17. The apparatus of claim 14, wherein the processor is further operative to perform the evaluating operation by returning one or more of the closest documents resulting from the search.

18. The apparatus of claim 14, wherein the processor is further operative to perform the evaluating operation by returning one or more matching word-chains in the one or more documents.

19. The apparatus of claim 14, wherein the processor is further operative to perform the evaluating operation by returning one or more matching topical words of the one or more documents.

20. The apparatus of claim 14, wherein the processor is further operative to perform the evaluating operation by generating a conceptual representation of a target document associated with the similarity query.

21. The apparatus of claim 20, wherein the processor is further operative to perform the evaluating operation by finding a substantially close match to a target document among a plurality of indexed documents using the conceptual representation of the target document.

22. Apparatus for performing a conceptual similarity search, the apparatus comprising:

at least one processor operative to: (i) generate one or more conceptual word-chains from one or more documents to be used in the conceptual similarity search; (ii) build a conceptual index of documents with the one or more word-chains; and (iii) evaluate a similarity query using the conceptual index; and memory, coupled to the at least one processor, for storing at least one of the conceptual word-chains and the conceptual index;

wherein the processor is further operative to perform the word-chain generating operation by initializing one or more word-chains to one or more sets of randomly selected documents; assigning one or more other documents to the one or more sets of randomly selected documents; concatenating the one or more documents in each set and removing less frequently occurring words from each word-chain; and merging the word-chains.

23. The apparatus of claim 22, wherein the processor is further operative to iteratively repeat the initializing, assigning, concatenating and merging operations.

24. Apparatus for performing a conceptual similarity search, the apparatus comprising:

at least one processor operative to: (i) generate one or more conceptual word-chains from one or more documents to be used in the conceptual similarity search; (ii) build a conceptual index of documents with the one or more word-chains; and (iii) evaluate a similarity query using the conceptual index; and memory, coupled to the at least one processor, for storing at least one of the conceptual word-chains and the conceptual index;

wherein the processor is further operative to perform the evaluating operation by generating a conceptual representation of a target document associated with the similarity query, and wherein the processor is further operative to perform the target document conceptual representation generating operation by calculating a similarity measure between the target document and each conceptual word-chain; determining whether each similarity measure is not less than a predetermined threshold value; and generating conceptual strength measures by respectively setting a conceptual strength measure to a similarity measure minus the predetermined threshold value, when the similarity measure is not less than a predetermined threshold value.

25. Apparatus for performing a conceptual similarity search, the apparatus comprising:
- at least one processor operative to: (i) generate one or more conceptual word-chains from one or more documents to be used in the conceptual similarity search; (ii) build a conceptual index of documents with the one or more word-chains; and (iii) evaluate a similarity query using the conceptual index; and
- memory, coupled to the at least one processor, for storing at least one of the conceptual word-chains and the conceptual index;
- wherein the processor is further operative to perform the evaluating operation by generating a conceptual representation of a target document associated with the similarity query and finding a substantially close match to a target document among a plurality of indexed documents using the conceptual representation of the target document, and wherein the processor is further operative to perform the finding operation by finding one or more concepts in the target document; evaluating an inverted list associated with the indexed documents to find the one or more documents which have at least one concept in common with the target document; calculating a conceptual cosine of the one or more common concept documents to the target document; finding the closest document to the target document based on the conceptual cosine; and reporting an output statistic between the closest matching document and the target document.

26. The apparatus of claim 25, wherein the processor is further operative to perform the closest document finding operation by: (i) reporting concepts which are present in the target document and the closest matching document; and (ii) finding a topical vocabulary which is common to the target document and the closest matching document and matching word-chains.

27. An article of manufacture for performing a conceptual similarity search, comprising a machine readable medium containing one or more programs which when executed implement the steps of:
- generating one or more conceptual word-chains from one or more documents to be used in the conceptual similarity search, wherein at least one of the one or more word-chains comprises a meta-document formed by applying a damping function to a set of the one or more documents, concatenating the document set after application of the damping function, and removing from the meta-document one or more least-weighted words;
- building a conceptual index of documents with the one or more word-chains; and
- evaluating a similarity query using the conceptual index.

28. The article of claim 27, wherein the index building step comprises the steps of:
- for each word-chain, finding the one or more documents with conceptual similarity to the word-chain; and
- retaining a list of identities of the one or more documents which have conceptual similarity not less than a predefined threshold value.

29. The article of claim 28, wherein a document identity comprises a unique integer value.

30. The article of claim 27, wherein the evaluating step comprises returning one or more of the closest documents resulting from the search.

31. The article of claim 27, wherein the evaluating step comprises returning one or more matching word-chains in the one or more documents.

32. The article of claim 27, wherein the evaluating step comprises returning one or more matching topical words of the one or more documents.

33. The article of claim 27, wherein the evaluating step comprises the step of generating a conceptual representation of a target document associated with the similarity query.

34. The article of claim 33, wherein the evaluating step comprises the step of finding a substantially close match to a target document among a plurality of indexed documents using the conceptual representation of the target document.

35. An article of manufacture for performing a conceptual similarity search, comprising a machine readable medium containing one or more programs which when executed implement the steps of:
- generating one or more conceptual word-chains from one or more documents to be used in the conceptual similarity search;
- building a conceptual index of documents with the one or more word-chains; and
- evaluating a similarity query using the conceptual index;
- wherein the word-chain generating step comprises the steps of:
- initializing one or more word-chains to one or more sets of randomly selected documents;
- assigning one or more other documents to the one or more sets of randomly selected documents;
- concatenating the one or more documents in each set and removing less frequently occurring words from each word-chain; and
- merging the word-chains.

36. The article of claim 35, wherein the initializing, assigning, concatenating and merging steps are iteratively repeated.

37. An article of manufacture for performing a conceptual similarity search, comprising a machine readable medium containing one or more programs which when executed implement the steps of:
- generating one or more conceptual word-chains from one or more documents to be used in the conceptual similarity search;
- building a conceptual index of documents with the one or more word-chains; and
- evaluating a similarity query using the conceptual index;
- wherein the evaluating step comprises the step of generating a conceptual representation of a target document associated with the similarity query, and wherein the target document conceptual representation generating step comprises the steps of:
- calculating a similarity measure between the target document and each conceptual word-chain;
- determining whether each similarity measure is not less than a predetermined threshold value; and
- generating conceptual strength measures by respectively setting a conceptual strength measure to a similarity measure minus the predetermined threshold value, when the similarity measure is not less than a predetermined threshold value.

38. An article of manufacture for performing a conceptual similarity search, comprising a machine readable medium containing one or more programs which when executed implement the steps of:
- generating one or more conceptual word-chains from one or more documents to be used in the conceptual similarity search;

building a conceptual index of documents with the one or more word-chains; and evaluating a similarity query using the conceptual index;

wherein the evaluating step comprises the step of generating a conceptual representation of a target document associated with the similarity query and finding a substantially close match to a target document among a plurality of indexed documents using the conceptual representation of the target document, and wherein the finding step comprises the steps of:

finding one or more concepts in the target document;

evaluating an inverted list associated with the indexed documents to find the one or more documents which have at least one concept in common with the target document;

calculating a conceptual cosine of the one or more common concept documents to the target document;

finding the closest document to the target document based on the conceptual cosine; and reporting an output statistic between the closest matching document and the target document.

39. The article of claim 38, wherein the closest document finding step further comprises the steps of:

reporting concepts which are present in the target document and the closest matching document; and finding a topical vocabulary which is common to the target document and the closest matching document and matching word-chains.

* * * * *

UNITED STATES PATENT AND TRADEMARK OFFICE
CERTIFICATE OF CORRECTION

PATENT NO.     : 6,542,889 B1
DATED          : April 1, 2003
INVENTOR(S)    : C.C. Aggarwal et al.

It is certified that error appears in the above-identified patent and that said Letters Patent is hereby corrected as shown below:

Column 1,
Line 14, delete "made-effective" and insert -- made effective --.
Line 38, delete "containing,a" and insert -- containing a --.

Column 5,
Line 43, delete "modem" and insert -- modern --.

Column 6,
Lines 5 and 6, delete " $|V1| = 2^2 + 4$ $2 + 5^2 + 3^2 = \sqrt{54}$ " and insert -- $|V1| = \sqrt{2^2 + 4^2 + 5^2 + 3^2} = \sqrt{54}$ --.

Lines 9 and 10, delete " $|V2| = 3$ $2 + 7^2 + 5^2 = \sqrt{83}$ " and insert -- $|V2| = \sqrt{3^2 + 7^2 + 5^2} = \sqrt{83}$ --.

Column 11,
Line 31, delete "matching-concepts" and insert -- matching concepts --.

Signed and Sealed this

Twenty-eighth Day of October, 2003

JAMES E. ROGAN
*Director of the United States Patent and Trademark Office*